(12) United States Patent
Mysyrowicz et al.

(10) Patent No.: US 7,854,304 B2
(45) Date of Patent: Dec. 21, 2010

(54) METHOD AND DEVICE FOR POWER SUPPLY TO AN ELECTRIC MOTOR VEHICLE

(75) Inventors: Andre Mysyrowicz, Versailles (FR); Michel Pellet, Paris (FR)

(73) Assignees: Centre National de la Recherche Scientifique (C.N.R.S.), Paris (FR); Ecole Polytechnique, Palaiseau (FR)

( * ) Notice: Subject to any disclaimer, the term of this patent is extended or adjusted under 35 U.S.C. 154(b) by 584 days.

(21) Appl. No.: 11/661,981

(22) PCT Filed: Sep. 8, 2005

(86) PCT No.: PCT/FR2005/002242

§ 371 (c)(1),
(2), (4) Date: Mar. 6, 2007

(87) PCT Pub. No.: WO2006/027503

PCT Pub. Date: Mar. 16, 2006

(65) Prior Publication Data

US 2007/0284205 A1    Dec. 13, 2007

(30) Foreign Application Priority Data

Sep. 8, 2004    (FR) .................................. 04 09485

(51) Int. Cl.
*B60L 5/00*    (2006.01)

(52) U.S. Cl. .......................... 191/50; 191/10; 191/45 R
(58) Field of Classification Search .................. 191/10, 191/45 R, 50, 54, 56, 59, 64, 66
See application file for complete search history.

(56) References Cited

U.S. PATENT DOCUMENTS 3,479,471 A    11/1969    Smith et al.
3,514,553 A *   5/1970    Bullis et al. .................... 191/56

FOREIGN PATENT DOCUMENTS

FR    2 269 431    11/1975

OTHER PUBLICATIONS

Luther et al., "Femtosecond laser triggering of a sub-100 picosecond jitter high-voltage spark gap", Applied Physics Letters, vol. 79, No. 20, Nov. 12, 2001, pp. 3248-3250, XP012029407.

* cited by examiner

*Primary Examiner*—Mark T Le
(74) *Attorney, Agent, or Firm*—Young & Thompson

(57) ABSTRACT

Method of producing a plasma conductor in air with the aid of a femtosecond high-frequency pulsing and high-repetition rate laser. The plasma is used for transmitting a current between an electric or catenary wire supplying a vehicle such as a train and an electric contact, for example a pantograph arm disposed on a moving vehicle and connected to a power distribution system thereof. The plasma is in contact with the electric or catenary wire and with an electric contact.

20 Claims, 1 Drawing Sheet

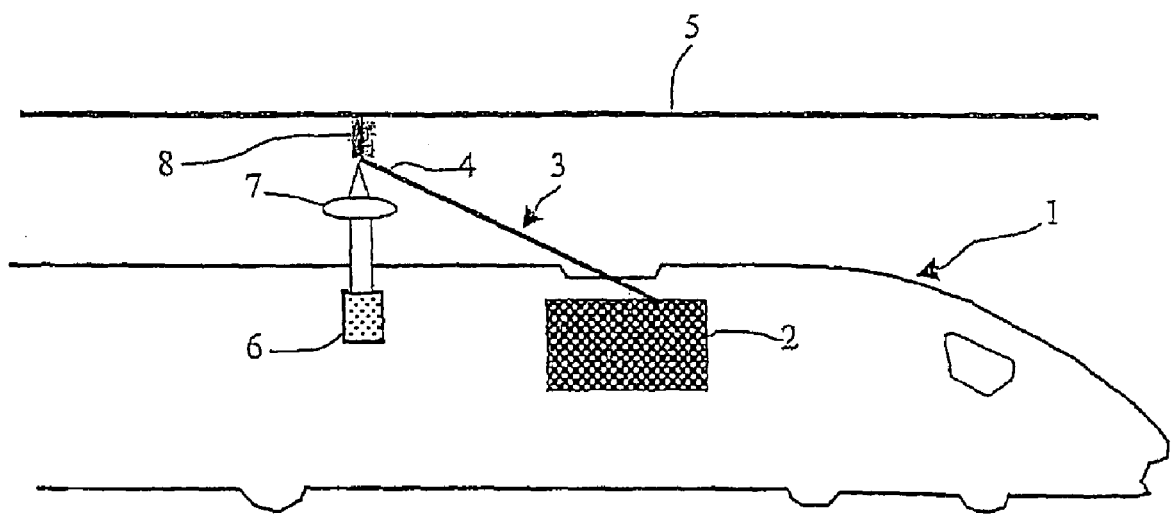
SINGLE FIGURE

METHOD AND DEVICE FOR POWER SUPPLY TO AN ELECTRIC MOTOR VEHICLE

BACKGROUND OF THE INVENTION

1. Field of the Invention

This invention relates to a method and a device for power supply to an electric motor vehicle from an electric power line. A particularly useful application relates to the field of electric motor vehicles for which the power supply is provided by an electric power line or catenary, such as for example electric trains and other urban and interurban means of transport. A particularly advantageous application relates to electric trains travelling at very high speed. However, the invention has wider scope since it can be applied to any high power supply system.

2. Description of the Related Art

For an electric train, current collection is conventionally associated with an articulated mechanical device called a pantograph which is responsible for establishing and maintaining electrical contact in order to supply power to the train's motor and all of its auxiliaries. The quality of the contact is highly dependent on the mechanical attributes of the pantograph and the electric and mechanical attributes of the catenary employed. It is in all cases subject to frictional forces. The quality of the contact becomes problematic when the train is travelling at high speed, as in high-speed trains. In fact, it is recognised that one of the problems affecting high-speed trains is maintaining good electrical contact between the catenary line and the pantograph of the train. For example, trials aiming to beat speed records require special adjustment of the tension of the conductor wire forming the power line.

SUMMARY OF THE INVENTION

The object of this invention is therefore to improve the quality of the electrical contact between the catenary line and the pantograph of a train or between any other electric current collection system.

Another object of the invention is to provide a solution to the problem of wear on the power line and the pantograph as a result of frictional forces.

At least one of the above objects is achieved by a method for power supply to an electric motor vehicle from a power line. The vehicle comprises at least one electric current collector, connected to the motor either directly or via a power distribution system. This collector has a potential difference in relation to the power line. According to the invention, femtosecond filamentation by means of a high power pulsed femtosecond laser is used to create a conductive plasma between the collector and the power line, the potential difference being sufficient for the plasma to initiate and guide an electrical discharge.

With the method according to this invention, in the absence of mechanical friction, the electric power delivered by a power line or catenary is conveyed to an electrical contact, the collector, located in the vehicle, static or mobile, and connected to the electric motor of the vehicle. Thus in contrast to the system currently in use, the permanent mechanical contact between the power line or catenary and the current collector contact has been dispensed with.

The plasma ensures high quality electrical contact between the power line and the collector, even at high speed, regardless of variations in the distance between the collector and the power line. In practice, one end of the collector can be positioned a few centimeters from the power line. However, the distance between the power line and the collector does not require critical adjustment, as the process of forming an electrical discharge initiated and guided by laser filamentation takes place over a few centimeters or even a few meters.

The method is therefore applicable for a wide range of vehicle speeds.

Generally, the process of formation of a region of ionized air exceeding the Rayleigh length of the laser beam is described in general in the scientific literature under the term femtosecond filamentation. A high-power laser pulse is capable of ionizing the molecules of the atmosphere. Short-pulse laser technology allows for the power levels required for ionization of the air to be reached with very moderate pulse energy, well below a joule. These lasers have a pulse duration of less than one picosecond, i.e. $10^{-12}$ second, and can deliver instantaneous power exceeding 10 GW, i.e. $10^7$ watts.

As an example, the inventors have demonstrated that infra-red pulses a few millijoules in power, focussed in air by means of a single lens, are sufficient to create a conductive plasma over distances of several centimeters around the focal point of the lens. The laser pulses were produced by a femtosecond laser with titanium-doped sapphire as the active medium. The physical process initiating ionization of the air over a significant length is well identified: it is a competition between self-focussing of the laser beam and multiphoton ionization involving the simultaneous absorption of a large number of infra-red photons. It has also been demonstrated in the laboratory that the plasma created by femtosecond filamentation makes it possible to temporarily short circuit a device comprising two electrodes subjected to an electric field of a few kV/cm. According to this invention, the power line is high voltage and the potential difference is preferably greater than 10 kV, for example between 10 and 25 kV.

Typically, with a 25 kV/cm electric field, a marked increase is noted in the current circulating through the air column located between two electrodes and an electrical discharge is obtained.

Currents reaching 700 amps have been measured. Higher-intensity currents may be obtained depending on the voltage in the power line used. This phenomenon can also be explained by the fact that the plasma column formed by filamentation heats a fine column of air which expands, thus creating a central depression. An electrical discharge rushes along this depression after a delay of less than 100 nanoseconds.

According to one characteristic of the invention, the laser operates at a high repetition rate, for example exceeding one kilohertz, in such a way that it regenerates the plasma and thus maintains good circulation of the electric current. Moreover, the power of the pulses supplied by the laser is preferably in excess of one millijoule.

In practice, a lens can be used to focus the high-power pulses supplied by the laser in air close to the power line and the end of the collector.

According to a non-limitative embodiment of the invention, said vehicle is a train and the collector is an associated pantograph.

According to another aspect of the invention, a device is proposed for supplying an electric current to an electric motor vehicle from a power line, said vehicle comprising at least one current collector connected to the motor and having a potential difference in relation to the power line. According to the invention, the device comprises a high power pulsed femtosecond laser used to create a conductive plasma between said collector and said power line by femtosecond filamentation, the potential difference being sufficient for the plasma to initiate and guide an electrical discharge.

Other advantages and characteristics of the invention will become apparent on examination of the detailed description of one embodiment that is in no way limitative, and of the single FIGURE attached.

BRIEF DESCRIPTION OF THE DRAWING FIGURE

The drawing FIGURE illustrates a train travelling on rails.

DETAILED DESCRIPTION

The single FIGURE illustrates a train 1 travelling on rails. The motor 2 of the train 1 is supplied with electric current by a pantograph 3 of which the free end 4, above the train, is positioned close to a catenary 5. The latter is a high-voltage power line, typically 25 kV. The train also comprises a femtosecond laser 6 supplying high-power pulses that are focussed in air close to the catenary 5 and the end 4 of the pantograph 3. Focussing is performed by means of a lens 7. The filamented beam forms a plasma column 8 connecting the catenary to the pantograph 3 by its end 4. The current circulating through the plasma is conducted by the pantograph to the electric motor 2.

The laser 6 operates at a high repetition rate, allowing for the plasma to be regenerated and avoiding breaks in the current. This femtosecond laser operates at rates exceeding one kilohertz, with pulse energies exceeding one millijoule.

The device according to the invention can be used multiply in several examples on the same train to increase the total current and to avoid any untimely cut in the supply of electric current.

Of course, the invention is not limited to the examples described above, and numerous modifications can be made to these examples without exceeding the scope of the invention. In particular, this invention can be applied to all systems responsible for conducting an electric current from a power supply line to an electric motor, whether mobile or otherwise.

The invention claimed is:

1. A method for supply an electric current to a traveling electric motor vehicle from a power line, said vehicle comprising at least one electric current collector connected to the motor and having a potential difference in relation to the power line, the method comprising:
   creating a conductive plasma between said current collector and said power line by femtosecond filamentation via a high power pulsed femtosecond laser in an absence of mechanical contact between the power line and the current collector; and
   initiating and guiding an electrical discharge,
   wherein the potential difference is sufficient for the plasma to initiate and guide the electrical discharge.

2. The method according to claim 1, wherein the laser operates at a high repetition rate in such a way as to regenerate the plasma.

3. The method according to claim 2, wherein the laser operates at a rate exceeding one kilohertz.

4. The method according to claim 1, wherein the power of the pulses supplied by the laser exceeds one millijoule.

5. The method according to claim 1, wherein the power line is a high-voltage power line, the potential difference exceeding 10 kV.

6. The method according to claim 1, wherein one end of the collector is positioned a few centimeters from the power line.

7. The method according to claim 1, wherein the high-power pulses generated by the laser are focussed in air close to the power line and the end of the collector.

8. The method according to claim 1, wherein the collector is a pantograph.

9. The method according to claim 1, wherein said vehicle is a train.

10. A device for supply an electric current to a traveling electric motor vehicle from a power line, said vehicle comprising at least one electric current collector connected to the motor and having a potential difference in relation to the power line, the device comprising:
    a high power pulsed femtosecond laser to initiate, by femtosecond filamentation, a conductive plasma between said current collector and said power line in an absence of mechanical contact between the power line and the current collector, the potential difference being sufficient for an electrical discharge to be initiated and guided by the plasma.

11. The device according to claim 10, wherein the device further comprises a lens to focus the high-power pulses supplied by the laser in air close to the power line and at an end of the collector.

12. The method according to claim 2, wherein the power of the pulses supplied by the laser exceeds one millijoule.

13. The method according to claim 2, wherein the power line is a high-voltage power line, the potential difference exceeding 10 kV.

14. The method according to claim 2, wherein one end of the collector is positioned a few centimeters from the power line.

15. The method according to claim 2, wherein the high-power pulses generated by the laser are focussed in air close to the power line and an end of the collector.

16. The method according to claim 2, wherein the collector is a pantograph.

17. The method according to claim 2, wherein said vehicle is a train.

18. A transportation system, comprising:
    a power line;
    a traveling electric motor vehicle formed from at least one electric current collector connected to the motor and having a potential difference in relation to the power line; and
    device for supplying an electric current to the traveling electric motor vehicle from the power line, the device comprising a high power pulsed femtosecond laser configured to initiate, by femtosecond filamentation, a conductive plasma between said current collector and said power line in an absence of mechanical contact between the power line and the current collector, the potential difference being sufficient for an electrical discharge to be initiated and guided by the plasma.

19. The transportation system according to claim 18, wherein the device further comprises a lens to focus the high-power pulses supplied by the laser in air close to the power line and at an end of the collector.

20. The transportation system according to claim 18, wherein said vehicle is a train.

* * * * *